(12) United States Patent
Harding et al.

(10) Patent No.: US 8,820,834 B2
(45) Date of Patent: Sep. 2, 2014

(54) DEVICE AND METHOD FOR IMPARTING A ROCKING MOTION TO AN INFANT CAR SEAT

(71) Applicants: Brian Stephen Harding, Midlothian, VA (US); Ashley Baka Harding, Midlothian, VA (US); James A. Doerr, Richmond, VA (US)

(72) Inventors: Brian Stephen Harding, Midlothian, VA (US); Ashley Baka Harding, Midlothian, VA (US); James A. Doerr, Richmond, VA (US)

( * ) Notice: Subject to any disclaimer, the term of this patent is extended or adjusted under 35 U.S.C. 154(b) by 0 days.

(21) Appl. No.: 13/767,981

(22) Filed: Feb. 15, 2013

(65) Prior Publication Data

US 2013/0214575 A1    Aug. 22, 2013

Related U.S. Application Data

(60) Provisional application No. 61/700,395, filed on Sep. 13, 2012, provisional application No. 61/600,039, filed on Feb. 17, 2012.

(51) Int. Cl.
*A47C 3/029* (2006.01)
*A47C 3/02* (2006.01)
*B60N 2/26* (2006.01)
*B60N 2/28* (2006.01)
*A47D 13/10* (2006.01)

(52) U.S. Cl.
CPC ............... *B60N 2/26* (2013.01); *B60N 2/2863* (2013.01); *B60N 2/28* (2013.01)
USPC .................................... 297/260.2; 297/260.1

(58) Field of Classification Search
CPC ........ A47D 13/102; A47D 13/10; A47D 9/04

USPC ......... 297/260.2, 260.1, DIG. 11; 5/109, 108; 446/326

See application file for complete search history.

(56) References Cited

U.S. PATENT DOCUMENTS

| 496,531 | A | * | 5/1893 | McCurdy | ........................ 5/105 |
| 2,150,465 | A | * | 3/1939 | Sonheim | ...................... 446/326 |
| 2,252,290 | A | * | 8/1941 | Konikoff | ...................... 446/397 |
| 2,599,948 | A | * | 6/1952 | Shvetz | ........................... 84/95.2 |
| 3,638,248 | A | * | 2/1972 | Silverglate | ..................... 5/105 |

(Continued)

FOREIGN PATENT DOCUMENTS

FR    2594310    8/1987

OTHER PUBLICATIONS

International Search Report and Written Opinion in International Application No. PCT/US2013/026348, dated Apr. 19, 2013, 10 pages.

*Primary Examiner* — David R Dunn
*Assistant Examiner* — Tania Abraham
(74) *Attorney, Agent, or Firm* — Brian J. Teague

(57) ABSTRACT

A device for imparting a rocking motion to a rockable object having a curved bottom surface comprises a wedge-shaped housing and a reciprocating drive mechanism. The wedge-shaped housing comprises an upper housing having an upper surface configured for contacting the curved bottom surface of the rockable object, the upper housing having a proximal end and a distal end; a lower housing having a base configured for sitting on a surface, the lower housing having a proximal end and a distal end; and a hinge portion hingedly joining the proximal ends of the upper and lower housings. The reciprocating drive mechanism alternatingly moves the distal end of the upper housing upward to an extended position and downward to a retracted position.

30 Claims, 13 Drawing Sheets

(56) References Cited

U.S. PATENT DOCUMENTS

| | | | |
|---|---|---|---|
| 3,653,080 A | 4/1972 | Hafele | |
| 3,851,343 A | 12/1974 | Kinslow, Jr. | |
| 4,028,753 A * | 6/1977 | Rios | 5/108 |
| 4,371,206 A | 2/1983 | Johnson, Jr. | |
| 4,598,946 A | 7/1986 | Cone | |
| 4,640,546 A * | 2/1987 | Aguilar | 297/259.2 |
| 4,656,680 A | 4/1987 | Wilson | |
| 4,911,499 A | 3/1990 | Meeker | |
| 4,985,949 A | 1/1991 | Jantz | |
| 5,342,113 A | 8/1994 | Wu | |
| 5,588,164 A | 12/1996 | Proulx | |
| 5,615,428 A * | 4/1997 | Li | 5/109 |
| 5,806,113 A * | 9/1998 | McMahan et al. | 5/109 |
| 5,860,698 A | 1/1999 | Asenstorfer et al. | |
| 5,863,097 A | 1/1999 | Harper | |
| D411,763 S | 7/1999 | Asenstorfer et al. | |
| 6,152,529 A * | 11/2000 | Beason | 297/260.2 |
| 7,037,205 B1 | 5/2006 | Bowman | |
| 7,537,285 B2 * | 5/2009 | Stewart | 297/260.1 |
| 7,845,722 B1 * | 12/2010 | Manenti et al. | 297/217.3 |
| 7,862,118 B2 * | 1/2011 | Sims, Jr. | 297/260.2 |
| 7,891,736 B2 * | 2/2011 | Sims, Jr. | 297/260.2 |
| 2005/0264063 A1 * | 12/2005 | Babcock et al. | 297/250.1 |
| 2009/0200846 A1 | 8/2009 | Yehuda | |
| 2010/0186164 A1 | 7/2010 | Jenkins | |

* cited by examiner

DEVICE AND METHOD FOR IMPARTING A ROCKING MOTION TO AN INFANT CAR SEAT

CROSS-REFERENCE TO RELATED APPLICATIONS

This application claims priority to U.S. Provisional Application Ser. No. 61/600,039, filed Feb. 17, 2012, and to U.S. Provisional Application Ser. No. 61/700,395, filed Sep. 13, 2012, the contents of which are incorporated herein by reference in their entirety.

FIELD OF THE INVENTION

The present invention relates to baby gear, and specifically to devices for rocking babies.

BACKGROUND

Infant car seats are used to safely hold and restrain an infant while traveling in a vehicle. Such infant car seats are also commonly used as a carrier for a baby, as the infant car seat is readily removable from its base in a vehicle and has a carrying handle. It is often convenient to keep an infant in a car seat for an extended period of time, even when outside of a vehicle, such as while dining out at a restaurant.

Most or all infant car seats have a curved bottom surface, usually with two parallel curved runners or rails. The curved bottom enables the car seat to be rocked, which is often soothing to the infant. The car seat may be rocked manually, but this can quickly become tiresome. It is well known to use an electromechanical device to rock an infant car seat, and many such devices have been devised. However, the known rocking devices are complicated, large, and cumbersome and, as such, are not easily transported with the car seat for use in any desired location.

BRIEF SUMMARY

In one embodiment of the invention, a device for imparting a rocking motion to an infant car seat comprises a wedge-shaped housing and a reciprocating drive mechanism. The wedge-shaped housing comprises an upper housing, a lower housing, and a hinge portion. The upper housing has an upper surface configured for contacting the curved bottom surface of the rockable object. The upper housing further has a proximal end and a distal end. The lower housing has a base configured for sitting on a surface. The lower housing further has a proximal end and a distal end. The hinge portion hingedly joins the proximal ends of the upper and lower housings, thereby forming a proximal end of the housing. The reciprocating drive mechanism alternatingly moves the distal end of the upper housing upward to an extended position and downward to a retracted position.

The upper housing may further comprise a distal wall projecting downward from the upper surface and opposing side walls projecting downward from the upper surface. The lower housing may further comprise a distal wall projecting upward from the base and opposing side walls projecting upward from the base. A portion of the lower housing may nest within the upper housing.

The upper housing may further comprise a distal wall projecting downward from the upper surface and opposing side walls projecting downward from the upper surface. The lower housing may further comprise a distal wall projecting upward from the base and opposing side walls projecting upward from the base. A first portion of the lower housing may nest within the upper housing when the upper housing is in the extended position. A second portion of the lower housing, larger than the first portion, may nest within the upper housing when the upper housing is in the retracted position.

The reciprocating drive mechanism may comprise a motor, a drive wheel selectively rotated by the motor, and a drive arm affixed at a proximal end to the drive wheel and at a distal end to the upper housing.

The device may further comprise a tether arm having a proximal end affixed to the housing and a distal end configured for placement under a portion of the curved bottom surface of the rockable object. The placement of the distal end of the tethering arm is on an opposite side of a surface-contacting portion of the curved bottom surface from the placement of a proximal end of the device. The proximal end of the tethering arm may be affixed to the proximal end of the housing. The tethering arm may be pivotably affixed to the housing and pivotable between an extended position and a retracted position. The distal end of the tethering arm may be generally L-shaped, U-shaped, or J-shaped.

In addition to the device for imparting a rocking motion to an infant car seat, as described above, other embodiments of the invention are directed to corresponding methods for imparting a rocking motion to an infant car seat.

Other embodiments of the invention are directed to a self-rocking infant car seat comprising a car seat body, one or more rails supporting the car seat body, the one or more rails having a curved bottom surface, an arm having a proximal end hingedly affixed to the curved bottom surface and a distal end, and a reciprocating drive mechanism alternatingly moving the distal end of the arm toward the curved bottom surface to a retracted position and away from the curved bottom surface to an extended position, the reciprocating drive mechanism at least partially housed within the car seat body or one of the one or more rails. The arm may have a contour corresponding to a contour of the curved bottom surface. The reciprocating drive mechanism may comprise a motor, a drive wheel selectively rotated by the motor, and a drive arm affixed at a proximal end to the drive wheel and at a distal end to the arm. The motor and drive wheel may be entirely housed within the car seat body or one of the one or more rails. A recess may be defined in the curved bottom surface, such that the arm resides within the recess when in the retracted position.

BRIEF DESCRIPTION OF THE SEVERAL VIEWS OF THE DRAWING(S)

Reference is made herein to the accompanying drawings, which are not necessarily drawn to scale, and wherein.

DETAILED DESCRIPTION

Embodiments of the invention may comprise a device for imparting a rocking motion to a seat or chair, such as an infant car seat, rocking chair, rocking bassinet, rocking horse, etc. In fact, embodiments of the invention may be used to impart a rocking motion to any rockable object having a curved bottom surface. The device is referred to herein as a car seat rocker. The car seat rocker of embodiments of the invention may comprise an alternatingly expanding/retracting ramp or wedge, as illustrated and described in relation to FIGS. 1-10, although other alternative embodiments are also described herein.

Figure 1:
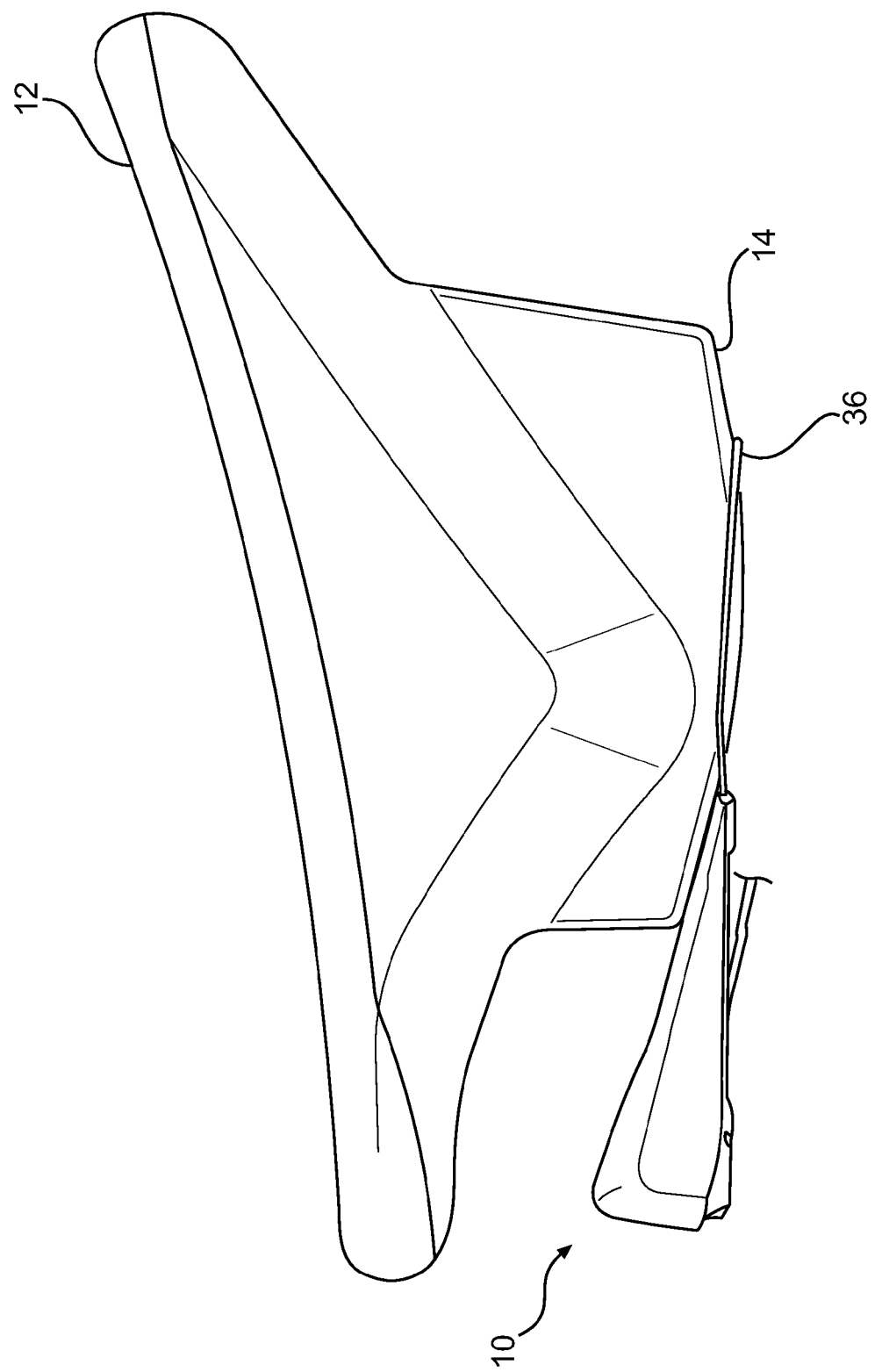
FIG. 1 is a side view of a car seat rocker positioned against an infant car seat and in a retracted position, in accordance with embodiments of the invention.
Figure 2:
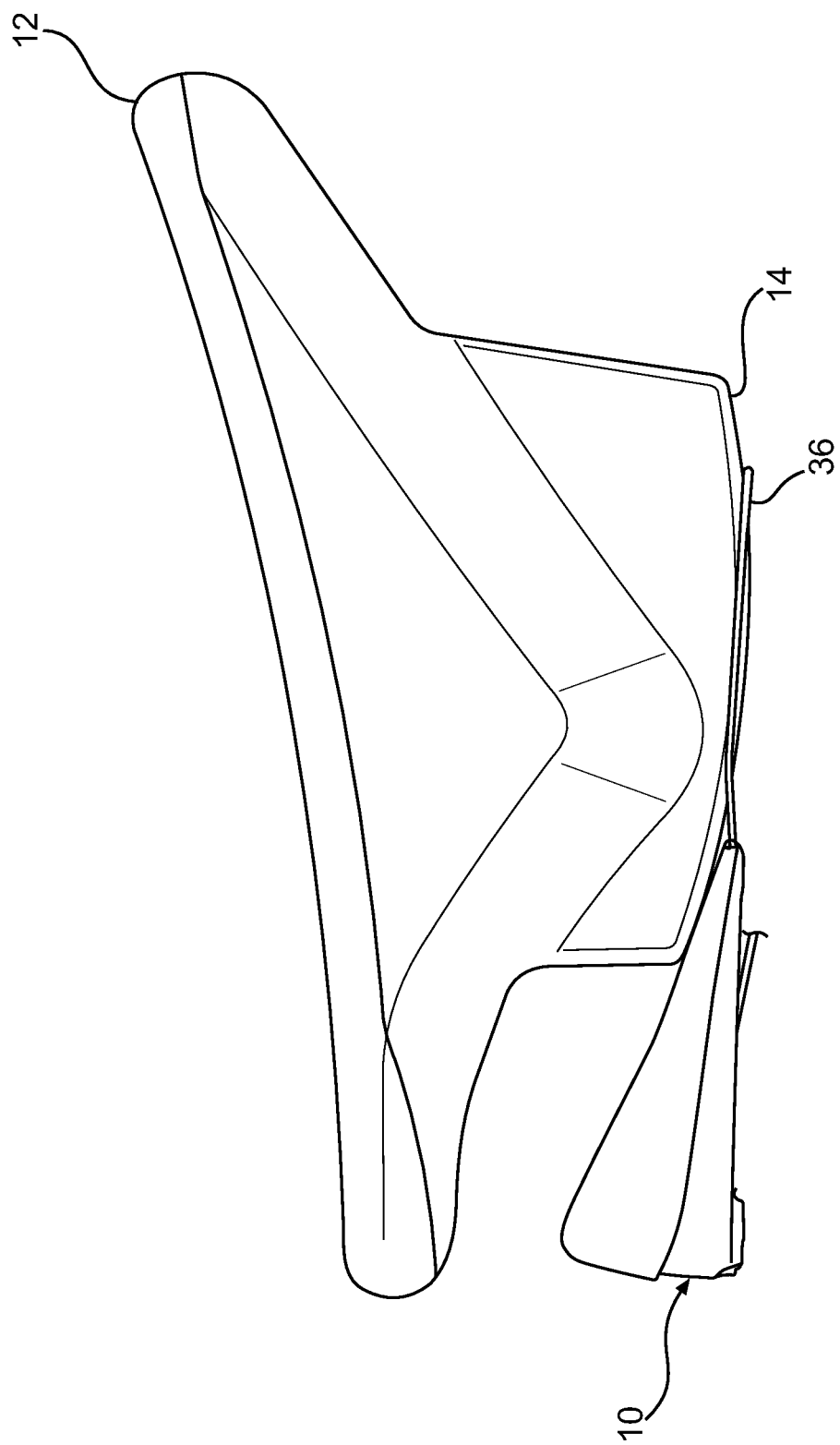
FIG. 2 is a side view of the car seat rocker of FIG. 1 positioned against an infant car seat and in an expanded position.
Figure 3:
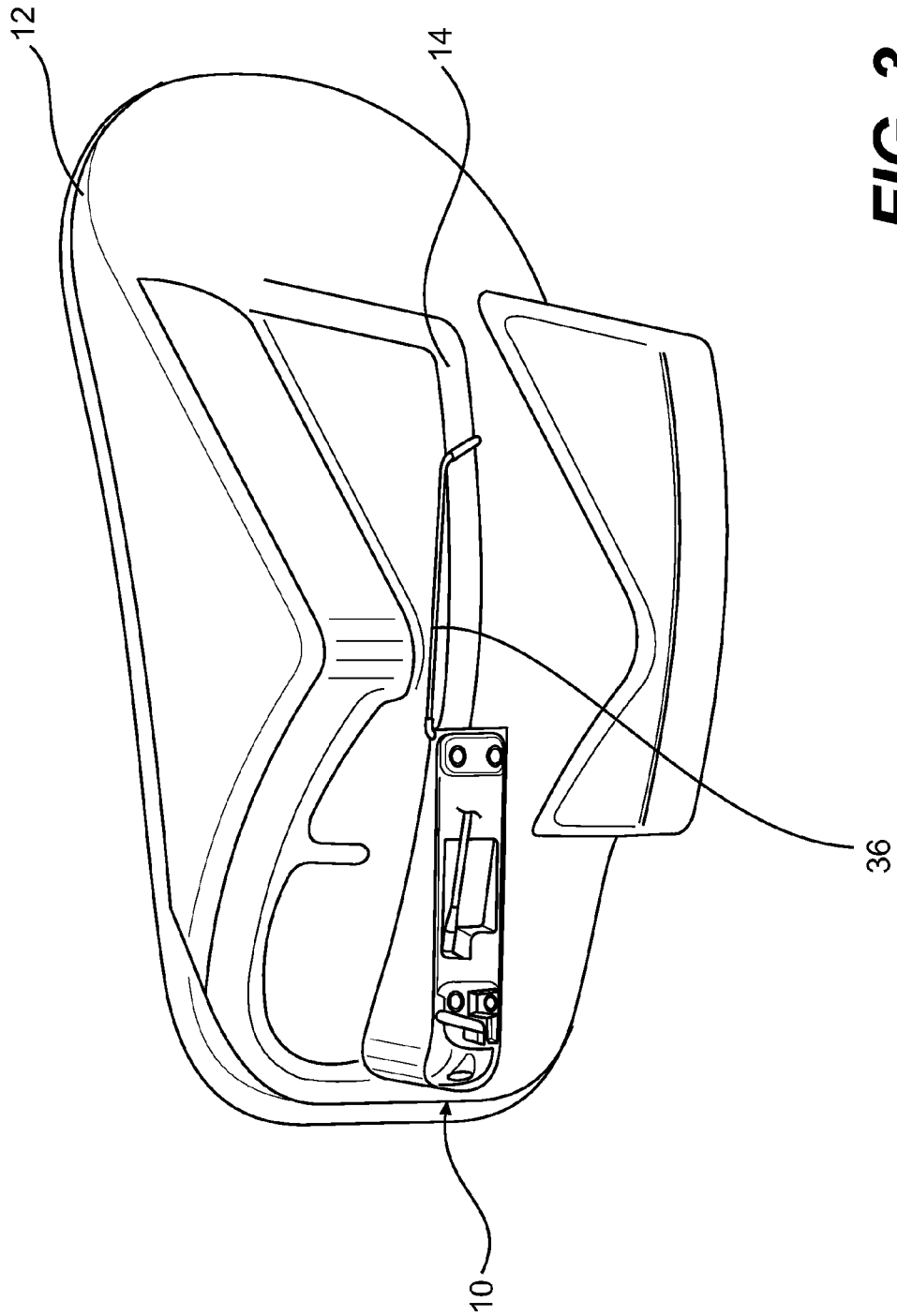
FIG. 3 is an underside view of the car seat rocker of FIG. 1 positioned against an infant car seat and in a refracted position.

Embodiments of the invention will now be described in detail. FIG. 1 is a side view of a car seat rocker positioned against an infant car seat and in a retracted position, in accordance with embodiments of the invention. FIG. 2 is a side view of the car seat rocker of FIG. 1 positioned against an infant car seat and in an expanded position. FIG. 3 is an underside view of the car seat rocker of FIG. 1 positioned against an infant car seat and in a retracted position.

As seen in FIGS. 1-3, infant car seats 12 generally have a curved bottom surface, typically in the form of two separate curved supports or rails 14, which enables a rocking motion to be imparted to the car seat. The car seat rocker 10 of embodiments of the invention is designed to be placed at least partially under at least one of the curved supports 14 while the car seat sits on a generally planar and generally smooth surface such as a floor. (FIGS. 1-3 illustrate the car seat rocker placed partially under the front edge of the curved support; the car seat rocker could alternatively be placed partially under the rear edge of the curved support.) The car seat rocker may generally be placed under the curved support 14 on either side of the car seat 12. The rocking motion is imparted to the car seat by the alternating expanding and retracting of the ramp. This alternating motion is seen in FIGS. 1-10. FIGS. 1, 3-7, and 9 illustrate the wedge in a retracted (down) position, while FIGS. 2, 8, and 10 illustrate the wedge in an expanded (up) position. Moving into the expanded position rocks the car seat backward by pushing up against the support 14, while moving into the refracted position allows the car seat to rock forward. (Of course, if the car seat rocker is instead placed partially under the rear edge of the curved support, then moving into the expanded position rocks the car seat forward by pushing up against the support 14, while moving into the retracted position allows the car seat to rock backward.) The forward rocking typically results merely from gravity acting on the car seat; however in alternative embodiments of the invention, the car seat rocker could be positively affixed to the car seat (using any suitable means of affixation, such as hook-and-loop fasteners, clamping mechanism, etc.) such that the car seat rocker actively rocks the car seat forward by pulling down on the support 14 when the car seat rocker 10 retracts (i.e., the car seat rocker alternatingly pushes and pulls on the car seat).

Car seat rocker 10 comprises an optional tether arm 36, which may be in either an extended position or a retracted position. When in the extended position (as illustrated in FIGS. 1-5 and 7-8), the tether arm 36 extends forward from the proximal end of the car seat rocker, at about floor level and parallel or nearly parallel to the surface upon which the car seat rocker and infant car seat sit. The car seat rocker 10 is positioned at least partially under one of the curved supports of the car seat, as described above. Additionally, the distal end of the tether arm is positioned under the curved support opposite the proximal end of the car seat rocker as illustrated in FIGS. 1-3. (The part of the curved support that is contacting the floor, ground, etc., when the car seat is still may be termed the "surface-contacting portion." The distal end of the tether is on an opposite side of the surface-contacting portion of the curved support from the proximal end of the car seat rocker.) In this way, the tether arm helps hold the car seat rocker and the infant car seat in position relative to each other as the car seat rocker extends and retracts to rock the infant car seat, thereby counteracting any tendency the car seat rocker might have to cause the infant car seat to move laterally away from the car seat rocker (i.e., to slide away from the car seat rocker). When in the retracted position (as illustrated in FIGS. 6 and 9-10), the tether arm 36 folds neatly away underneath the car seat rocker 10 for storage.

Figure 4:
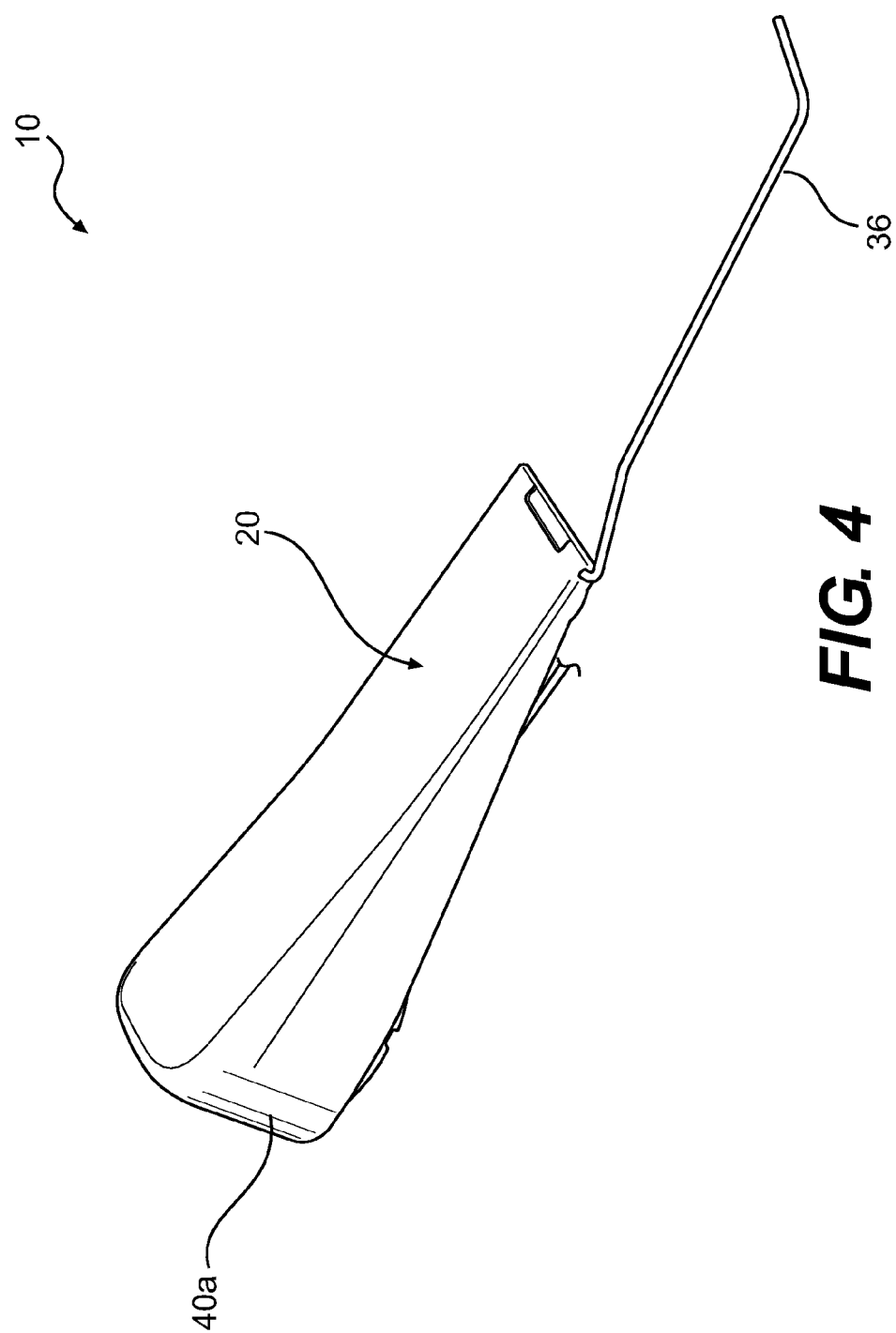
FIG. 4 is a perspective view of the car seat rocker of FIG. 1 in a retracted position.
Figure 5:
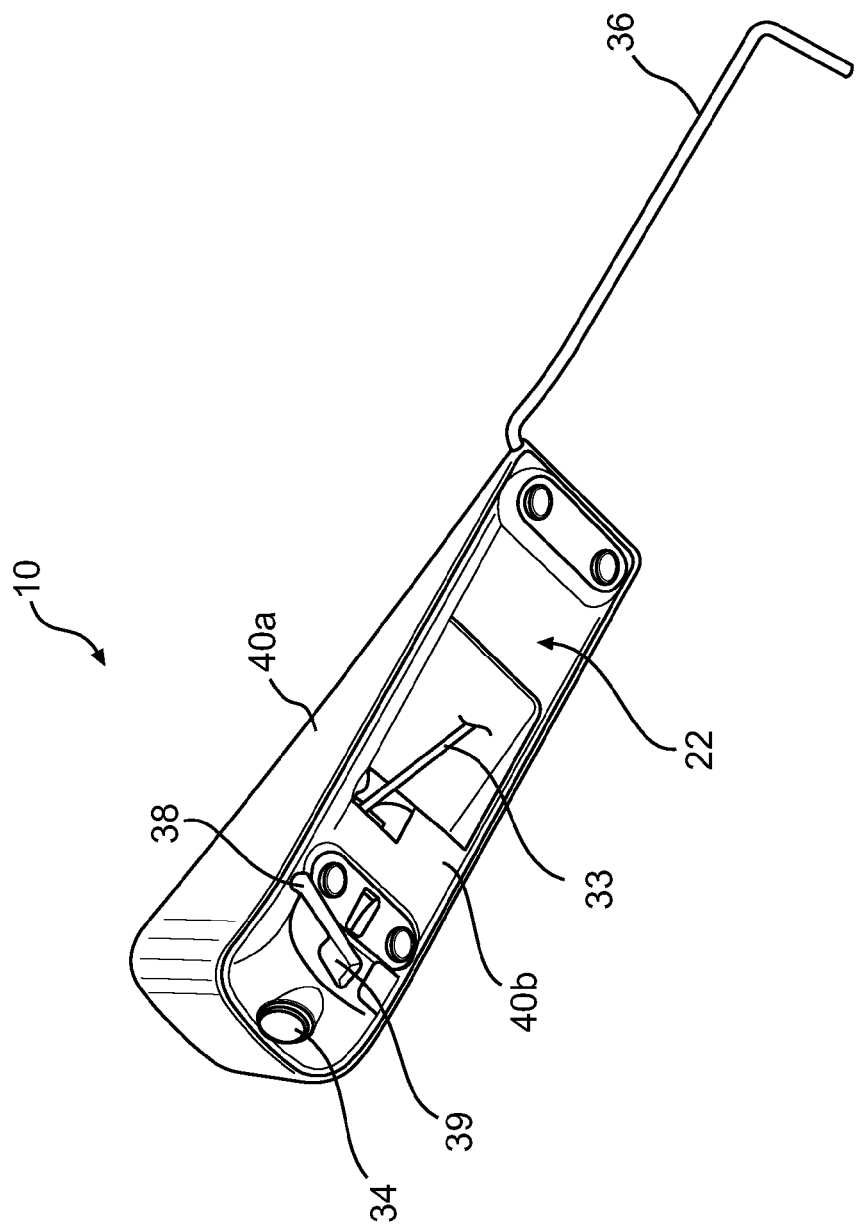
FIG. 5 is an underside view of the car seat rocker of FIG. 1 in a retracted position.
Figure 6:
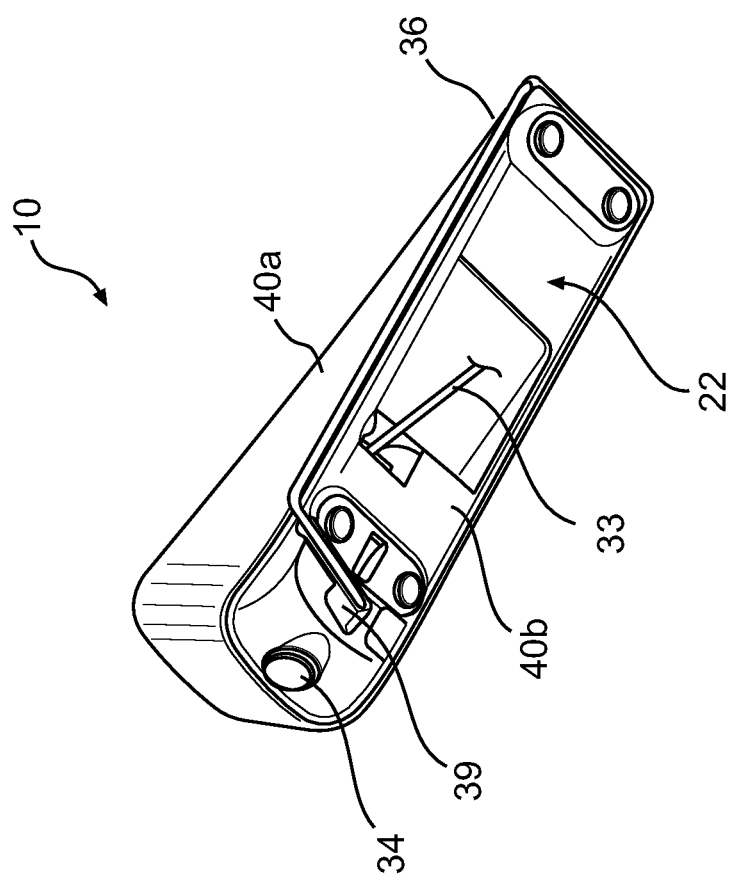
FIG. 6 is an underside view of the car seat rocker of FIG. 1 in a retracted position and with a tether arm in a retracted position.
Figure 7:
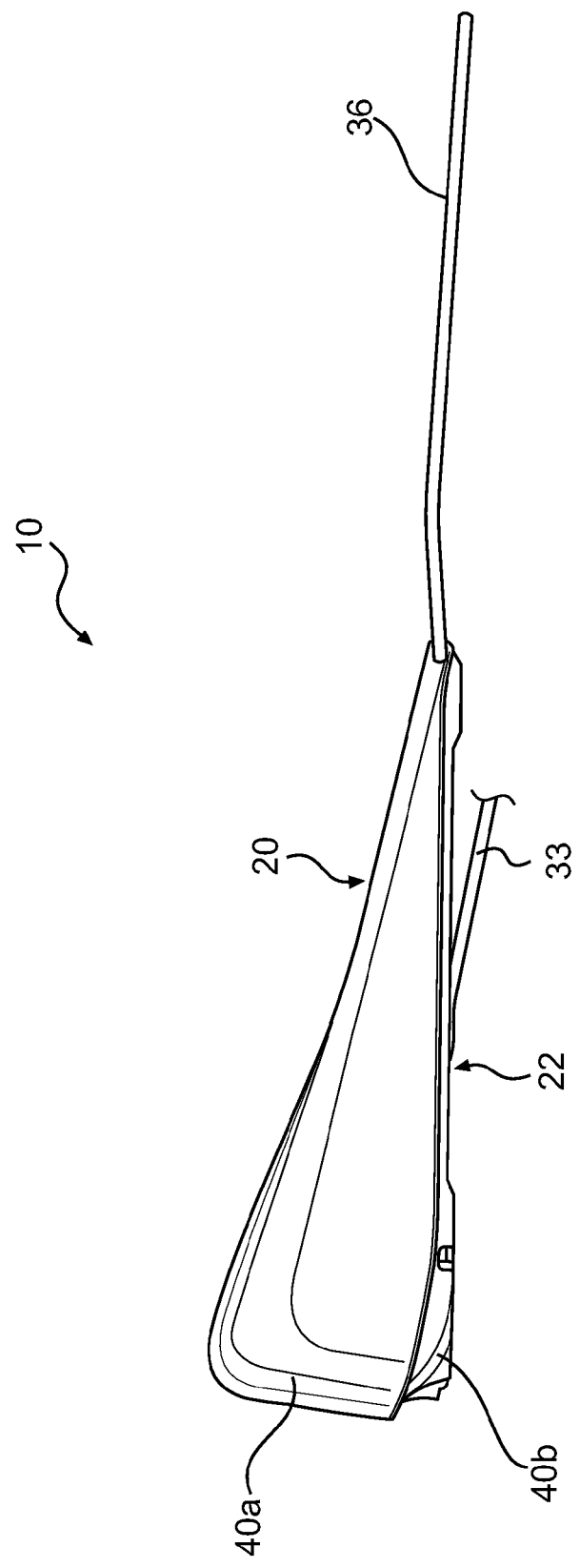
FIG. 7 is a side view of the car seat rocker of FIG. 1 in an refracted position.
Figure 8:
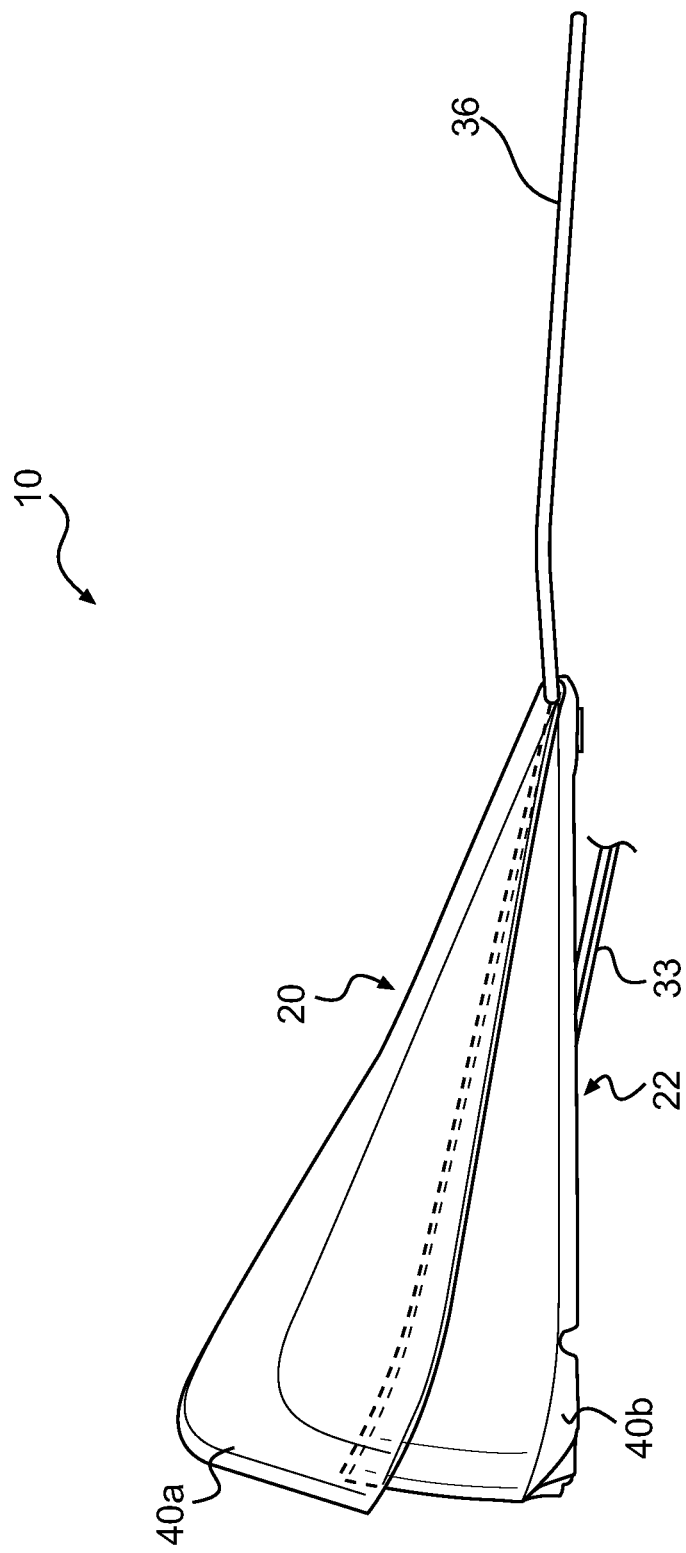
FIG. 8 is a side view of the car seat rocker of FIG. 1 in an expanded position.
Figure 9:
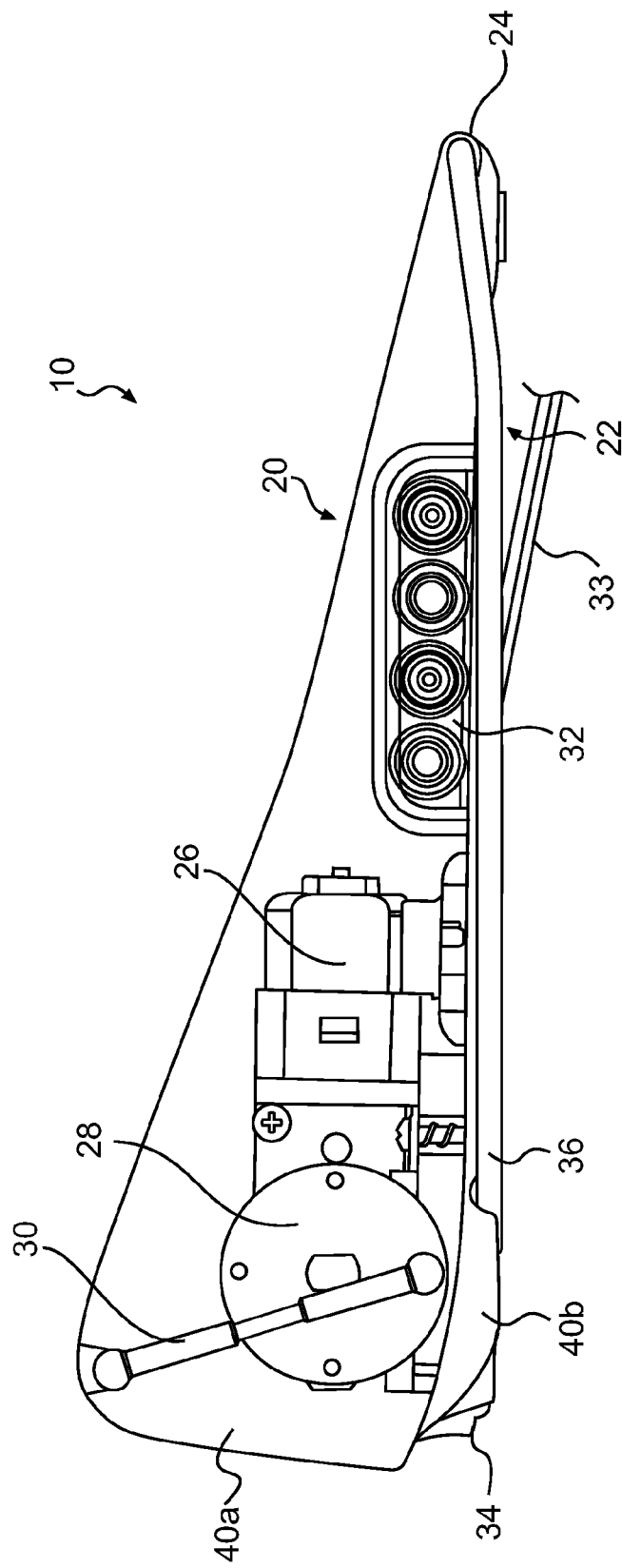
FIG. 9 is a cutaway side view of the car seat rocker of FIG. 1 in a retracted position.
Figure 10:
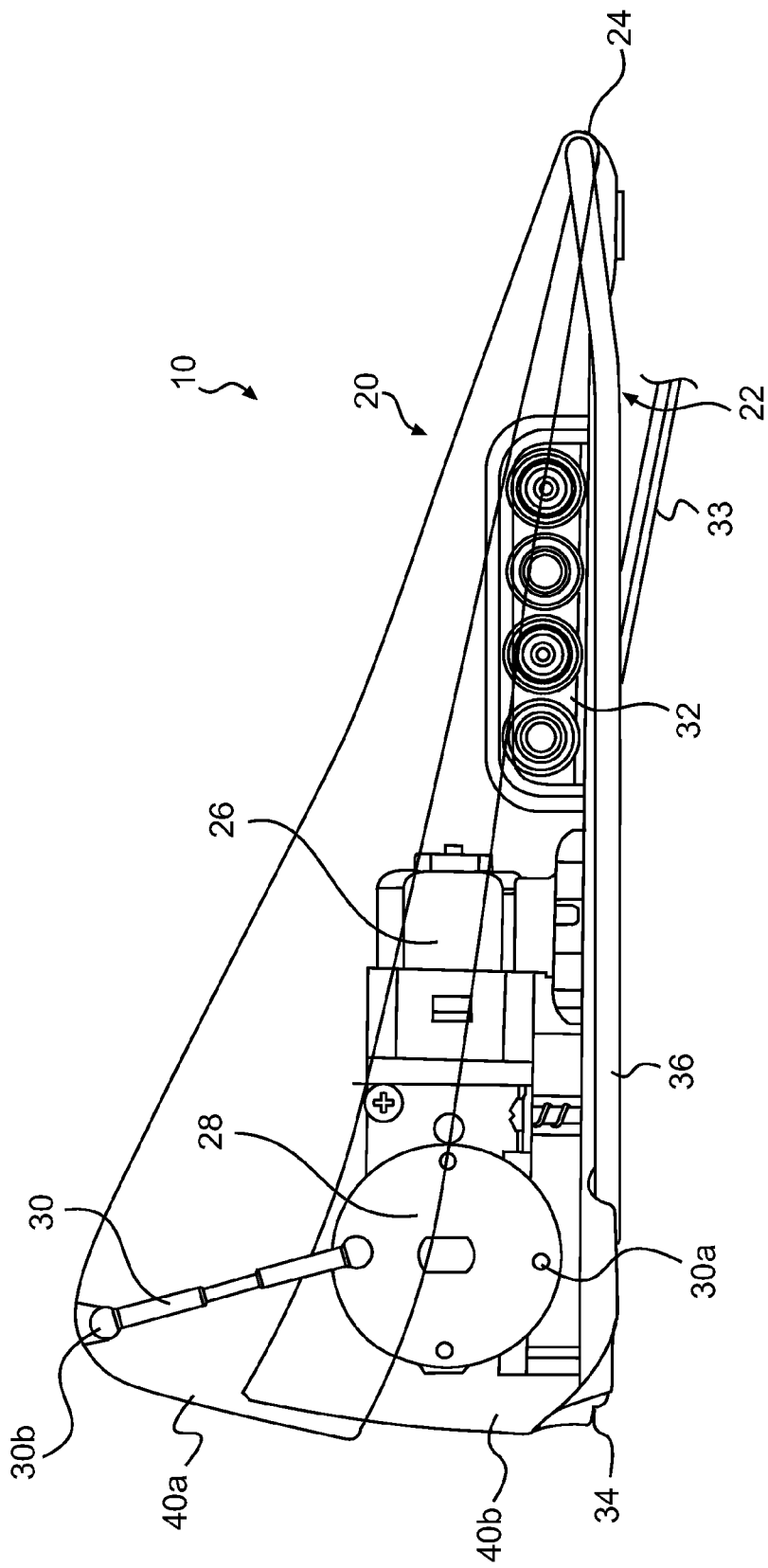
FIG. 10 is a cutaway side view of the car seat rocker of FIG. 1 in an expanded position.

Referring now to FIGS. 4-10, the structure and operation of the car seat rocker 10 will be described in more detail. FIG. 4 is a perspective view of the car seat rocker of FIG. 1 in a retracted position. FIG. 5 is an underside view of the car seat rocker of FIG. 1 in a retracted position. FIG. 6 is an underside view of the car seat rocker of FIG. 1 in a retracted position and with a tether arm in a retracted position. FIG. 7 is a side view of the car seat rocker of FIG. 1 in a retracted position. FIG. 8 is a side view of the car seat rocker of FIG. 1 in an expanded position. FIG. 9 is a cutaway side view of the car seat rocker of FIG. 1 in a retracted position. FIG. 10 is a cutaway side view of the car seat rocker of FIG. 1 in an expanded position.

Car seat rocker 10 comprises a top surface 20 and a base 22, joined by a hinge 24. The ends of the top surface 20 and base 22 adjoining the hinge may be termed the "proximal" ends, while the opposing ends may be termed the "distal" ends. Car seat rocker functions by having a drive mechanism (described in more detail below) drive the top surface 20 upward and away from the base 22 which sits atop a supporting surface (e.g., a floor). The car seat rocker is generally ramp- or wedge-shaped. The ramp or wedge shape has several advantages over other possible shapes. For example, the wedge shape enables easy insertion of the hinged end underneath the car seat support such that the top surface is in contact with the car seat support 14. The wedge shape enables the car seat rocker to adapt to many different car seat designs, including car seats with many different curved bottom surface shapes and contours. The wedge shape also allows different positions relative to the car seat based on, for example, the baby's weight. For example, the car seat rocker may be positioned closer to or further away from the car seat depending on the weight of the baby. The size and dimensions of the car seat rocker may vary as desired. The width of the top surface and base will typically, although not necessarily, be about equal (the top will typically be slightly wider than the bottom to enable the bottom housing to nest within the top housing, as discussed below). The width of the top surface will generally be wide enough to provide a stable point of contact with the underside of most or all car seats on the market. The overall length of the car seat rocker may vary, but as seen in the figures, the length is typically significantly longer than just the portion of the car seat rocker that is in contact with the car seat. This additional (non-contact) length provides a mechanical advantage, but that comes at the expense of needing a longer stroke length (i.e., a longer stroke length at the distal end of the car seat rocker is needed to provide a fairly short stroke length at the proximal (contact) end).

The top surface 20 may have any suitable surface treatment or texture, such as smooth, non-skid, or resilient (e.g., cushioned). The underside of the base may be generally planar or may have protrusions (e.g., feet) that provide isolated points of contact to restrict movement of the car seat rocker when placed on carpeting or other similar soft surface. The underside of the base may have a non-skid surface. If the underside of the base has protrusions, the underside of the protrusions may have a non-skid surface.

The car seat rocker 10 may comprise a nested, clamshell housing having an upper housing 40a and a lower housing 40b. In such a nested arrangement, the lower housing will typically nest inside the upper housing (a larger portion of the lower housing will nest inside the upper housing when the car seat rocker is in the retracted position, while a smaller portion of the lower housing will nest inside the upper housing when the car seat rocker is in the extended position). The top surface 20 may be part of an upper housing 40a, while the base 22 may be part of a lower housing 40b. The upper housing 40a and the lower housing 40b are joined by hinge 24. The housing may encloses the drive mechanism and other internal components to prevent injuries to users (preventing pinch points) or damage to the drive mechanism or other components. The nesting capability of the housing enables the full up/down motion of the top surface without exposing the internal components. The nesting capability is perhaps best seen in FIGS. 9 and 10.

The housing may be formed as a single structure. Such a single structure would typically use a "living" or "live" hinge. Alternatively, the upper and lower housing may be formed separately, and as such would typically use a "pin" type hinge. The proximal end of the tether arm may function as the hinge pin for the upper and lower housing hinge, as discussed below.

As mentioned above, car seat rocker 10 includes an optional tether arm 36 that helps hold the car seat rocker and the infant car seat in position relative to each other as the car seat rocker extends and retracts to rock the infant car seat. FIGS. 5 and 6 illustrate the underside of the car seat rocker with the tether arm, respectively, in an extended and refracted position. The tether arm is pivotable between an extended position (seen in FIGS. 1-5 and 7-8) and a retracted position (seen in FIGS. 6, 9, and 10). The tether arm is pivoted to the extended position for use, and to the retracted position for storage. The hinge or pivot point for the tether arm is the same as the hinge point 24 for the top surface and the base. In fact, the proximal end of the tether arm may function as the hinge pin for the upper and lower housing hinge, in addition to enabling the pivoting capability of the tether arm. As seen in FIGS. 5 and 6, the lower housing has a recess 38 on the bottom to receive the tether arm in the retracted position. The recess 38 has a finger portion 39 to enable a user to insert a fingertip to remove the distal end of the tether arm from the recess in order to pivot the tether arm to the extended position. The longest portion of the tether arm 36 is held in place along the body of the car seat rocker 10 when in the closed position.

FIGS. 9 and 10 are cutaway side view of car seat rocker 10, in which the housing is made transparent so that some of the internal components are visible. As seen in FIGS. 9 and 10, the drive mechanism comprises a motor 26 that rotates (directly, via a gear box, or using any suitable mechanism) a drive wheel 28. The drive mechanism further comprises a drive arm 30. The end of the drive arm connected to the drive wheel may be termed the "proximal" end, while the end of the drive arm connected to the upper housing may be termed the "distal" end. Rotation of the drive wheel (propelled by the motor) causes the drive arm to alternatingly raise and lower, thereby alternatingly raising and lowering the upper housing relative to the lower housing. As seen in FIG. 9, when the portion of the drive wheel 28 at which the proximal end of the drive arm is connected is at its lowest point, the distal end is also at its lowest point and the upper housing is fully retracted. Conversely as seen in FIG. 10, when the portion of the drive wheel 28 at which the proximal end of the drive arm is connected is at its highest point, the distal end is also at its highest point and the upper housing is fully expanded.

The motor is typically selected to provide sufficient power (which may be, for example, specified in terms of stall current and stall torque) to raise the upper housing and to correspondingly rock an infant car seat in which an infant is placed. For example, one specific embodiment of the invention comprises a motor having a stall current (at 6 volts) of 700 milliamps, and a stall torque (at 6 volts) of 76.38 inch-ounces, although the motor specifications may vary depending on the specific design of an embodiment. The motor may be selected to provide a desired level of noise while operating. The desired level of noise is typically not enough noise to disturb the infant, although some noise may be desirable as such white noise may be comforting to the infant.

Any suitable type or configuration of motor may be used, including but not limited to gear motor, direct drive motor, stepper motor, right-angled or straight. Additionally, any suitable non-motor drive mechanism may be used, including but not limited to solenoid, diaphragm pump, wind-up crank, or piezo-electric drive. Any suitable gearing arrangement (or no gearing) may be used, including but not limited to worm gear or helical gear.

The motor may be single speed, multi-speed, or variable speed. If a single speed motor is used, the car seat rocker will typically comprise a simple on/off switch 34 for turning the motor on and off, thereby turning the car seat rocker on and off. If a multi-speed or variable speed motor is used, an appropriate control switch (rather than a simple on/off switch) will typically be used. For example the control switch may comprise a three position switch (off/low/high) or a slider switch (e.g., rheostat or potentiometer). Additional electronics (not illustrated) may be needed, for example, to provide motor control.

The car seat rocker will typically comprise a power supply, such as battery pack 32. Any suitable number or type of batteries may be used. The battery pack may use replaceable or non-replaceable batteries. The battery pack may use rechargeable or non-rechargeable batteries. The car seat rocker may optionally comprise an AC adapter (only the cord 33 is illustrated) to power the motor and/or to recharge the batteries in the battery pack.

While embodiments of the invention are described herein as being generally ramp- or wedge-shaped, the contour of the top surface may vary (while still providing a generally ramp- or wedge-shape to the overall device. For example, the top surface may have a single, uniform angle relative to the base along the entire length of the top surface, or the top surface may have two or more differently angled portions. In the illustrated embodiments of the invention, the top surface of the car seat rocker has a sloped portion proximal to the hinged end that has a smaller angle relative to the base, and a slope portion distal to the hinged end that has a larger angle (i.e., is more steep) relative to the base. In other embodiments of the invention, the top surface of the car seat rocker may have a sloped portion proximal to the hinged end and a flat (or less steep) portion distal to the hinged end (in such an embodiment, the transition from the sloped portion to the flat (or less steep) portion may be angular or curved).

In alternative embodiments of the invention (not illustrated), any suitable drive mechanism may be used to extend and retract the top surface. Instead of the drive mechanism illustrated in FIGS. 9 and 10, a car seat rocker of embodiments of the invention may comprise a motor which rotates a cam, with the rotation of the cam directly propelling the top surface up and down (rather than having an intermediate drive arm as in the illustrated embodiments. The cam could directly contact the underside of the top surface, or the cam could contact a downwardly expanding protrusion from the underside of the top surface. The cam could be circular or oblong, and if oblong, the difference between the longer diameter and the shorter diameter may vary depending on the desired amount of extension/retraction movement of the top surface. If the cam is circular, the axis of rotation will be off-center to produce the desired eccentric rotation and thus the desired extension/retraction movement of the top surface. If the cam is oblong, the axis of rotation may be centered or off-center.

A car seat rocker of alternative embodiments of the invention may comprise a stop block internal to the housing which would contact the underside of top surface when the car seat rocker is in the retracted position to limit the downward movement of the top surface. Such a stop block may have any suitable shape or size. A car seat rocker of alternative embodiments of the invention may comprise a spring connected to both the top surface and the base. Such a spring may be compressed when the car seat rocker is in the retracted position such that the spring provides assistance to propel the top surface upward and dampens the downward movement of the top surface.

Figure 11:
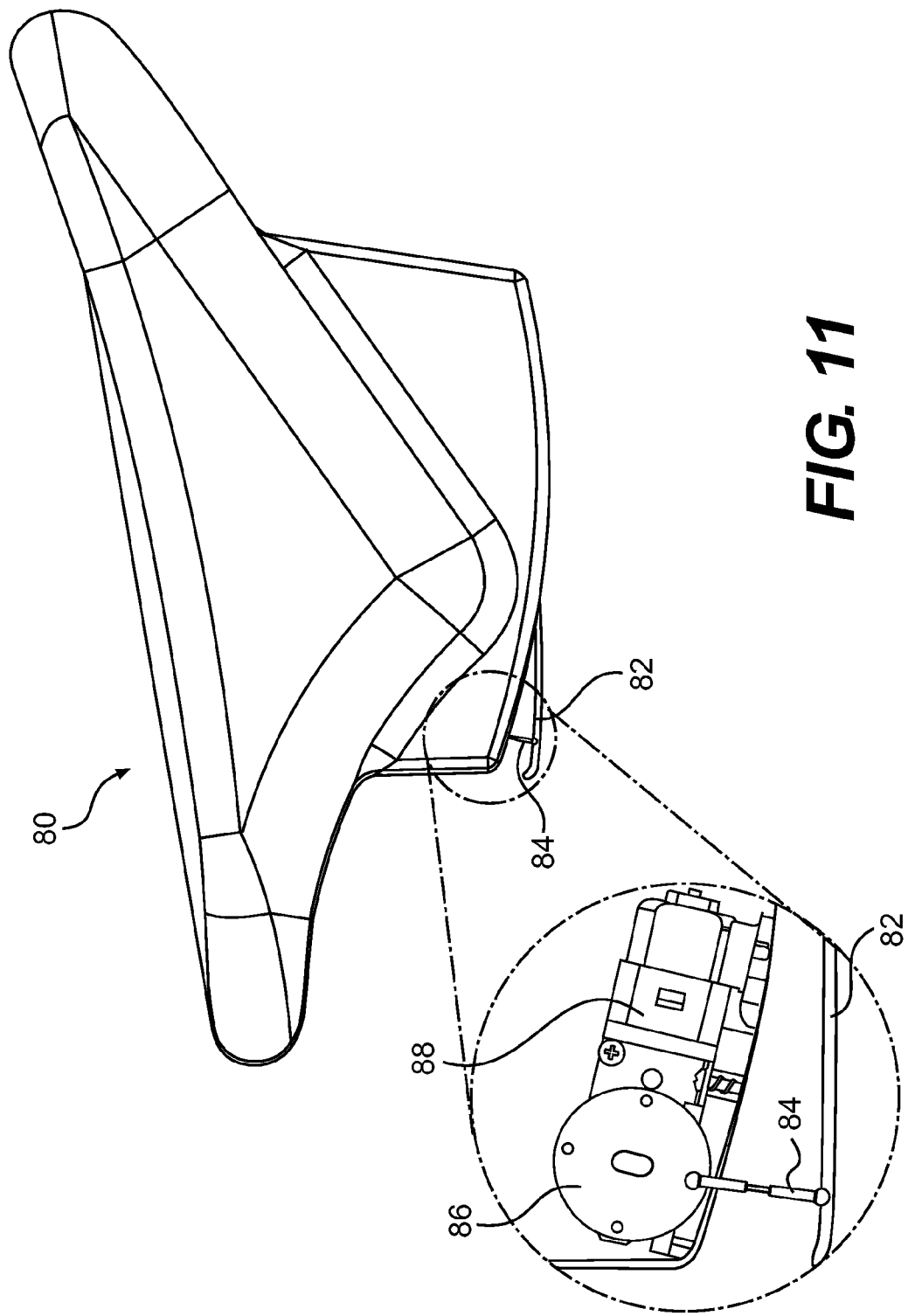
FIG. 11 is a side view of a car seat having a built-in car seat rocker, in accordance with alternative embodiments of the invention.

FIG. 11 is a side view of a car seat 80 having a built-in car seat rocker, in accordance with alternative embodiments of the invention. FIG. 11 includes an inset showing a cutaway view of the bottom left corner of car seat 80, showing the internal components of the built-in car seat rocker. The built-in car seat rocker mechanism of car seat 80 is built into the curved bottom surface of the car seat (such as into one or both of the two separate curved supports). The built-in car seat rocker comprises a downwardly extending ramp 82 that pushes the front of the car seat upward to rock when the ramp expands. Ramp 82 will typically have a curved shape that is substantially the same curve as the underside of the car seat support. Thus, when retracted (not illustrated), ramp 82 may be substantially flush with the underside of the curved bottom surface of the car seat. The ramp may fit within a recess in the underside of the car seat support so that the ramp is completely recessed. The ramp is connected to the car seat at a proximal end via any suitable hinge or hinge-type mechanism (not illustrated). The distal end of ramp 82 is pushed down and pulled up via any suitable drive mechanism (including but not limited to any of the different drive mechanisms described herein), thereby imparting the desired rocking motion to the car seat. In the embodiment illustrated in FIG. 11, the drive mechanism comprises a motor 88, drive wheel 86, and drive arm 84. Drive arm 84 is connected to the ramp near the distal end. The drive arm extends up into the hollow interior of the car seat support where the drive arm is connected to drive wheel 86 which is in turn connected to and rotated by motor 88. Drive arm 84 is fully recessed within the car seat structure when the built-in car seat rocker is fully retracted. Drive wheel 86 and motor 88 are both fully recessed within the car seat structure at all times. A power source (not illustrated) to power the motor, such as a battery pack, would also be recessed within the car seat structure (alternatively, an AC power adapter may be used, which would include an external AC adapter plug). A switch (not illustrated) would control the motor. Rotation of the drive wheel by the motor causes the drive arm to alternatingly extend and retract, thereby in turn causing the ramp to alternatingly expand and retract to impart the desired rocking motion. Vertical guards (not illustrated) may extend from the side edges and distal edge of the ramp upward into the hollow interior of the car seat support to prevent pinch points. While FIG. 11 illustrates the built-in car seat rocker positioned near the front edge of the car seat support, the built-in car seat rocker could instead be positioned near the rear edge of the car seat support (in which case the built-in car seat rocker would be reversed front-to-back). If desired, two or more car seat rockers could be built-in to a car seat. For example, each of the two car seat supports could have built-in car seat rockers, each one positioned near the front edge of its corresponding support. In such a case, the two built-in car seat rockers would work in tandem to rock the car seat (both expanding at the same time and both retracting at the same time), thereby enabling the use of less powerful motors. Alternatively, two built-in car seat rockers could both be built into the same support, with one positioned near the front edge and one positioned near the rear edge. In such a case, the two built-in car seat rockers would work in opposition to rock the car seat (one expanding while the other retracts, and vice versa).

Figure 12:
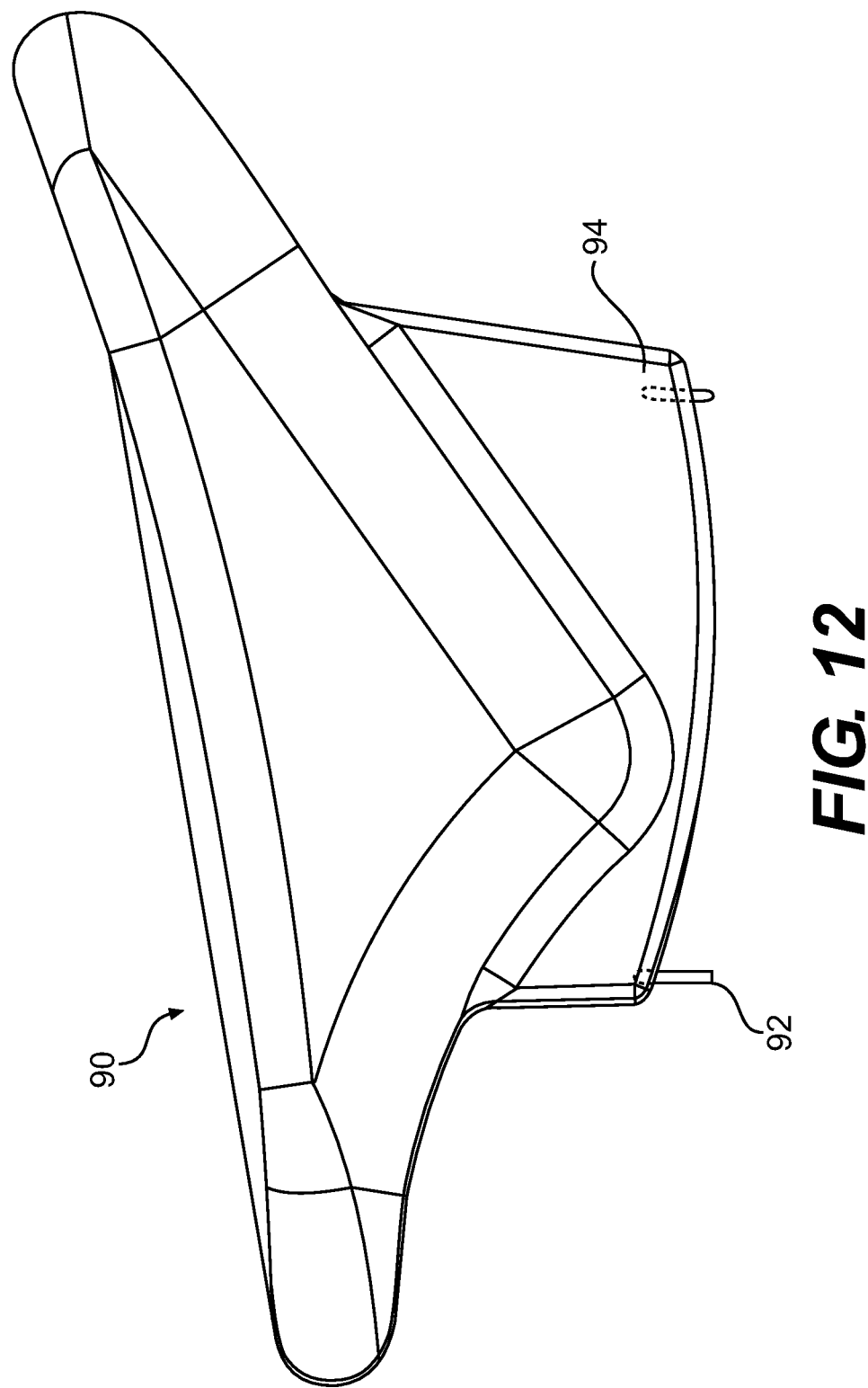
FIG. 12 is a side view of a car seat having a built-in car seat rocker, in accordance with further alternative embodiments of the invention.

FIG. 12 is a side view of a car seat 90 having a built-in car seat rocker, in accordance with further alternative embodiments of the invention. The built-in car seat rocker of car seat 90 is built into the curved bottom surface of the car seat (such as into one or both of the two separate curved supports). The built-in car seat rocker comprises two extending/retracting vertical posts that work in opposition to rock the car seat. Front post 92 extends downward to push the front of the car seat upward (i.e., rocking the car seat backward), while rear post 94 retracts to allow the car seat to rock backward. Alternatingly, rear post 94 extends downward to push the rear of the car seat upward (i.e., rocking the car seat forward), while front post 92 retracts to allow the car seat to rock forward. When one of the posts is retracted (as the rear post 94 is in FIG. 22), the bottom of that post is substantially flush with the underside of the curved bottom surface of the car seat. The built-in car seat rocker of car seat 90 may have the ability to fully retract both posts at the same time, which may be desirable when the car seat is being transported or used in a vehicle. The posts are extended and retracted via any suitable drive mechanism (including but not limited to any of the different drive mechanisms described herein) (the drive mechanism is not illustrated in FIG. 22), thereby imparting the desired rocking motion to the car seat. The posts extend up into the hollow interior of the car seat support where each post is connected to its respective drive mechanism. The drive mechanisms are fully recessed within the car seat structure. A power source (not illustrated) to power the motors, such as a battery pack, would also be recessed within the car seat structure, and a switch (not illustrated) would control the motor. While FIG. 22 illustrates the built-in car seat rocker having one post positioned near the front edge of the car seat support and one post positioned near the rear edge, other configurations are contemplated and are within the scope of the invention. For example, each of the two car seat supports could have front and rear posts (for a total of four posts). In such a case, the two front posts would work in tandem to rock the car seat backward (both extending at the same time and both retracting at the same time), and the two rear posts would work in tandem to rock the car seat forward (both extending at the same time and both retracting at the same time), thereby enabling the use of less powerful motors.

Figure 13:
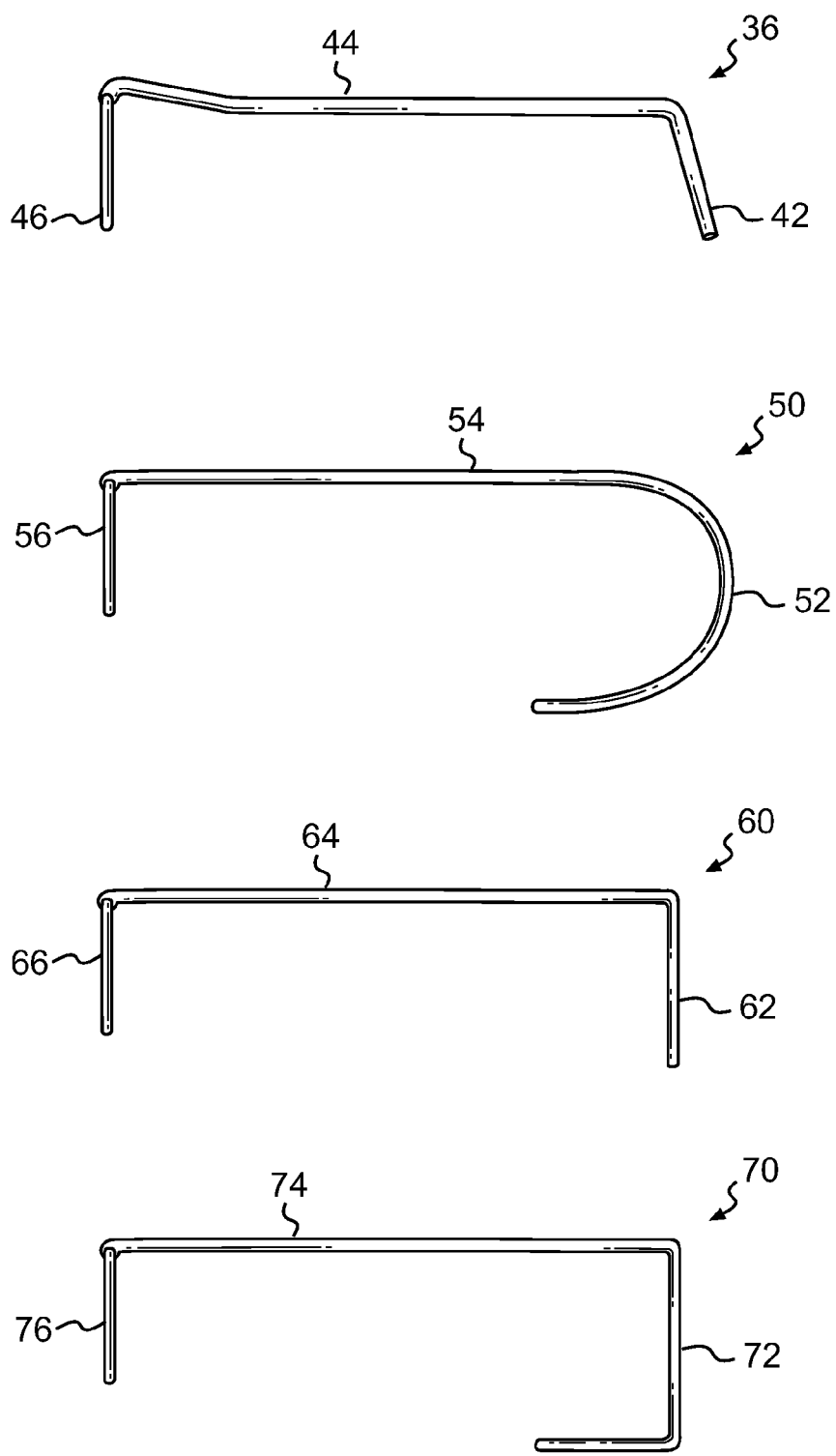
FIG. 13 is a top view of some possible tether arm configurations of a car seat rocker, in accordance with alternative embodiments of the invention.

FIG. 13 is a top view of the tether arm 36 of the car seat rocker 10 of FIGS. 1-10, along with three other possible configurations of tether arm. The tether arm (in its entirely and particularly the distal end) may have any suitable shape and size, as long as the tether arm is able to perform the desired function of helping hold the car seat rocker and the infant car seat in position relative to each other as the car seat rocker extends and retracts to rock the infant car seat. Tether arm 36 comprises a distal end 42, a proximal end 46, and a body 44 therebetween. As discussed above, the proximal end 46 enables the tether arm 36 to pivot between an extended and a retracted position. The proximal end 46 may also function as the hinge pin hingedly connecting the upper and lower housings (this is true of the proximal ends of all of the tether arm configurations illustrated in FIG. 13). The distal end 42 of tether arm 36 is straight and angled at slightly less than 90 degrees from the body 44. Tether arm 50 comprises a distal end 52, a proximal end 56, and a body 54 therebetween. The distal end 52 of tether arm 50 is curved such that the tether arm has a U-shape or a J-shape. Tether arm 60 comprises a distal end 62, a proximal end 66, and a body 64 therebetween. The distal end 62 of tether arm 60 is straight and angled at about 90 degrees from the body 44. Tether arm 70 comprises a distal end 72, a proximal end 76, and a body 74 therebetween. The distal end 72 of tether arm 70 has two straight portions, the first angled at about 90 degrees from the body 44 and the second angled at about 90 degrees from the first angled portion toward the proximal end.

The tether arm of car seat rockers of embodiments of the invention may be constructed of any suitable material, such as metal, plastic, rubber. The tether arm may be rigid or flexible, and if flexible may have varying degrees of flexibility. The tethering arm may be solid or hollow (e.g., tubular). Rather than being a rod, as in the illustrated example, the tethering arm may be an elongated, substantially planar surface, which may have one or more raised projections (bumps, ridges, ribs, etc.) at or near the distal end. The tethering arm could be a cord, string, or the like, which may be retractable and which may have a rigid or flexible bar, hook, or other similar element at its distal end.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

That which is claimed:

1. A device for imparting a rocking motion to a rockable object having a curved bottom surface, the device comprising:
    a wedge-shaped housing, the wedge-shaped housing comprising:
        an upper housing having an upper surface configured for contacting the curved bottom surface of the rockable object, the upper housing having a proximal end and a distal end;
        a lower housing having a base configured for sitting on a surface, the lower housing having a proximal end and a distal end; and
        a hinge portion hingedly joining the proximal ends of the upper and lower housings, thereby forming a proximal end of the housing;
    a reciprocating drive mechanism alternatingly moving the distal end of the upper housing upward to an extended position and downward to a retracted position; and
    a tethering arm having a proximal end affixed to the housing and a distal end configured for placement under a portion of the curved bottom surface of the rockable object, the tethering arm being selectively extendable and retractable.

2. The device of claim 1, wherein the upper housing further comprises a distal wall projecting downward from the upper surface and opposing side walls projecting downward from the upper surface; wherein the lower housing further comprises a distal wall projecting upward from the base and opposing side walls projecting upward from the base; and wherein a portion of the lower housing nests within the upper housing.

3. The device of claim 1, wherein the upper housing further comprises a distal wall projecting downward from the upper surface and opposing side walls projecting downward from the upper surface; wherein the lower housing further comprises a distal wall projecting upward from the base and opposing side walls projecting upward from the base; wherein a first portion of the lower housing nests within the upper housing when the upper housing is in the extended position; wherein a second portion of the lower housing nests within the upper housing when the upper housing is in the retracted position; and wherein the second portion is larger than the first portion.

4. The device of claim 1, wherein the reciprocating drive mechanism comprises a motor, a drive wheel selectively rotated by the motor, and a drive arm affixed at a proximal end to the drive wheel and at a distal end to the upper housing.

5. The device of claim 1,
    wherein the placement of the distal end of the tethering arm is on an opposite side of a surface-contacting portion of the curved bottom surface from the placement of a proximal end of the device.

6. The device of claim 1, wherein the proximal end of the tethering arm is affixed to the proximal end of the housing.

7. The device of claim 1, wherein the tethering arm is pivotably affixed to the housing and pivotable between an extended position and a refracted position.

8. The device of claim 1, wherein the distal end of the tethering arm is generally L-shaped, U-shaped, or J-shaped.

9. A device for imparting a rocking motion to a rockable object having a curved bottom surface, the device comprising:
- a wedge-shaped housing, the wedge-shaped housing comprising:
  an upper housing having an upper surface configured for contacting the curved bottom surface of the rockable object, the upper housing having a proximal end and a distal end;
  a lower housing having a base configured for sitting on a surface, the lower housing having a proximal end and a distal end; and
  a hinge portion hingedly joining the proximal ends of the upper and lower housings, thereby forming a proximal end of the housing;
- a reciprocating drive mechanism alternately moving the distal end of the upper housing upward to an extended position and downward to a retracted position; and
- a tethering arm having a proximal end affixed to the housing and a distal end configured for placement under a portion of the curved bottom surface of the rockable object, the tethering arm being selectively extendable and retractable, the placement of the distal end of the tethering arm being on an opposite side of a surface-contacting portion of the curved bottom surface from the placement of a proximal end of the device.

10. The device of claim 9, wherein the upper housing further comprises a distal wall projecting downward from the upper surface and opposing side walls projecting downward from the upper surface; wherein the lower housing further comprises a distal wall projecting upward from the base and opposing side walls projecting upward from the base; and wherein a portion of the lower housing nests within the upper housing.

11. The device of claim 9, wherein the upper housing further comprises a distal wall projecting downward from the upper surface and opposing side walls projecting downward from the upper surface; wherein the lower housing further comprises a distal wall projecting upward from the base and opposing side walls projecting upward from the base; wherein a first portion of the lower housing nests within the upper housing when the upper housing is in the extended position; wherein a second portion of the lower housing nests within the upper housing when the upper housing is in the retracted position; and wherein the second portion is larger than the first portion.

12. The device of claim 9, wherein the reciprocating drive mechanism comprises a motor, a drive wheel selectively rotated by the motor, and a drive arm affixed at a proximal end to the drive wheel and at a distal end to the upper housing.

13. The device of claim 9, wherein the proximal end of the tethering arm is affixed to the proximal end of housing.

14. The device of claim 9, wherein the tethering arm is pivotably affixed to the housing and pivotable between an extended position and a retracted position.

15. The device of claim 9, wherein the distal end of the tethering arm is generally L-shaped, U-shaped, or J-shaped.

16. A method for imparting a rocking motion to a rockable object having a curved bottom surface, the method comprising:
- placing a hinged end of a wedge-shaped housing at least partially under at least a portion of a curved bottom surface of the rockable object, the wedge-shaped housing comprising:
  an upper housing having an upper surface configured for contacting the curved bottom surface of the rockable object, the upper housing having a proximal end and a distal end;
  a lower housing having a base configured for sitting on a surface, the lower housing having a proximal end and a distal end; and
  a hinge portion hingedly joining the proximal ends of the upper and lower housings, thereby forming a proximal end of the housing;
- placing a distal end of a tethering arm under a portion of the curved bottom surface of the rockable object, the tethering arm having a proximal end affixed to the housing, the tethering arm being selectively extendable and retractable; and
- alternately moving the distal end of the upper housing upward to an extended position and downward to a retracted position.

17. The method of claim 16, wherein the upper housing further comprises a distal wall projecting downward from the upper surface and opposing side walls projecting downward from the upper surface; wherein the lower housing further comprises a distal wall projecting upward from the base and opposing side walls projecting upward from the base; and wherein a portion of the lower housing nests within the upper housing.

18. The method of claim 16, wherein the upper housing further comprises a distal wall projecting downward from the upper surface and opposing side walls projecting downward from the upper surface; wherein the lower housing further comprises a distal wall projecting upward from the base and opposing side walls projecting upward from the base; wherein a first portion of the lower housing nests within the upper housing when the upper housing is in the extended position; wherein a second portion of the lower housing nests within the upper housing when the upper housing is in the retracted position; and wherein the second portion is larger than the first portion.

19. The method of claim 16, wherein alternately moving the distal end of the upper housing upward to an extended position and downward to a retracted position comprises engaging a reciprocating drive mechanism comprising a motor, a drive wheel selectively rotated by the motor, and a drive arm affixed at a proximal end to the drive wheel and at a distal end to the upper housing.

20. The method of claim 16,
wherein the placement of the distal end of the tethering arm is on an opposite side of a surface-contacting portion of the curved bottom surface from the placement of a hinged end of the housing, the tethering arm having a proximal end affixed to the housing.

21. The method of claim 16, wherein the proximal end of the tethering arm is affixed to the proximal end of the housing.

22. The method of claim 16, wherein the tethering arm is pivotably affixed to the housing and pivotable between an extended position and a retracted position.

23. The method of claim 16, wherein the distal end of the tethering arm is generally L-shaped, U-shaped, or J-shaped.

24. A method for imparting a rocking motion to a rockable object having a curved bottom surface, the method comprising:
- placing a hinged end of a wedge-shaped housing at least partially under at least a portion of a curved bottom surface of the rockable object, the wedge-shaped housing comprising:

an upper housing having an upper surface configured for contacting the curved bottom surface of the rockable object, the upper housing having a proximal end and a distal end;

a lower housing having a base configured for sitting on a surface, the lower housing having a proximal end and a distal end; and a hinge portion hingedly joining the proximal ends of the upper and lower housings, thereby forming a proximal end of the housing;

alternatingly moving the distal end of the upper housing upward to an extended position and downward to a retracted position; and placing a distal end of a tethering arm under a portion of the curved bottom surface of the rockable object, the tethering arm being selectively extendable and retractable, the placement of the distal end of the tethering arm being on an opposite side of a surface-contacting portion of the curved bottom surface from the placement of a hinged end of the housing, the tethering arm having a proximal end affixed to the housing.

25. The method of claim 24, wherein the upper housing further comprises a distal wall projecting downward from the upper surface and opposing side walls projecting downward from the upper surface; wherein the lower housing further comprises a distal wall projecting upward from the base and opposing side walls projecting upward from the base; and wherein a portion of the lower housing nests within the upper housing.

26. The method of claim 24, wherein the upper housing further comprises a distal wall projecting downward from the upper surface and opposing side walls projecting downward from the upper surface; wherein the lower housing further comprises a distal wall projecting upward from the base and opposing side walls projecting upward from the base; wherein a first portion of the lower housing nests within the upper housing when the upper housing is in the extended position; wherein a second portion of the lower housing nests within the upper housing when the upper housing is in the retracted position; and wherein the second portion is larger than the first portion.

27. The method of claim 24, wherein alternatingly moving the distal end of the upper housing upward to an extended position and downward to a retracted position comprises engaging a reciprocating drive mechanism comprising a motor, a drive wheel selectively rotated by the motor, and a drive arm affixed at a proximal end to the drive wheel and at a distal end to the upper housing.

28. The method of claim 24, wherein the proximal end of the tethering arm is affixed to the proximal end of the housing.

29. The method of claim 24, wherein the tethering arm is pivotably affixed to the housing and pivotable between an extended position and a refracted position.

30. The method of claim 24, wherein the distal end of the tethering arm is generally L-shaped, U-shaped, or J-shaped.

* * * * *